United States Patent [19]

Frankiewicz et al.

[11] Patent Number: 5,378,441
[45] Date of Patent: Jan. 3, 1995

[54] METHOD TO SCAVENGE HYDROGEN SULFIDE FROM NATURAL GAS

[75] Inventors: Theodore C. Frankiewicz, Westminster; Clifford D. Juengst, Aliso Viejo, both of Calif.

[73] Assignee: Union Oil Company of California, Los Angeles, Calif.

[21] Appl. No.: 16,683

[22] Filed: Feb. 11, 1993

[51] Int. Cl.$^6$ .............................................. C01B 17/16
[52] U.S. Cl. ...................................... 423/220; 423/222; 423/242.6; 423/574.1; 423/242.1; 95/235
[58] Field of Search ............... 423/574 R, 574 L, 222, 423/210, 220, 242.6, 574.1, 574.2, 575, 242.1; 208/293, 242; 210/708; 585/827; 95/235

[56] References Cited

U.S. PATENT DOCUMENTS

| | | | |
|---|---|---|---|
| 4,171,349 | 10/1979 | Cucuiat et al. | 423/574 L |
| 4,948,494 | 8/1990 | Stout | 208/293 |

FOREIGN PATENT DOCUMENTS

| | | | |
|---|---|---|---|
| 50-89403 | 7/1975 | Japan | 208/242 |
| 56-2825 | 1/1981 | Japan | 95/235 |
| 60-258294 | 12/1985 | Japan | 423/222 |
| 1230650 | 5/1986 | U.S.S.R. | 95/235 |

Primary Examiner—Gary P. Straub
Assistant Examiner—Timothy C. Vanoy
Attorney, Agent, or Firm—Charles L. Hartman; Gregory F. Wirzbicki

[57] ABSTRACT

Hydrogen sulfide is removed from natural gas by contacting the natural gas with a scrubber oil that absorbs the hydrogen sulfide. The natural gas typically contains some water, or water can be added, and the resulting mixture is used to form a water-in-scrubber oil emulsion. Sulfur dioxide added to the water-in-oil emulsion reacts with the hydrogen sulfide present in the emulsion.

23 Claims, 1 Drawing Sheet

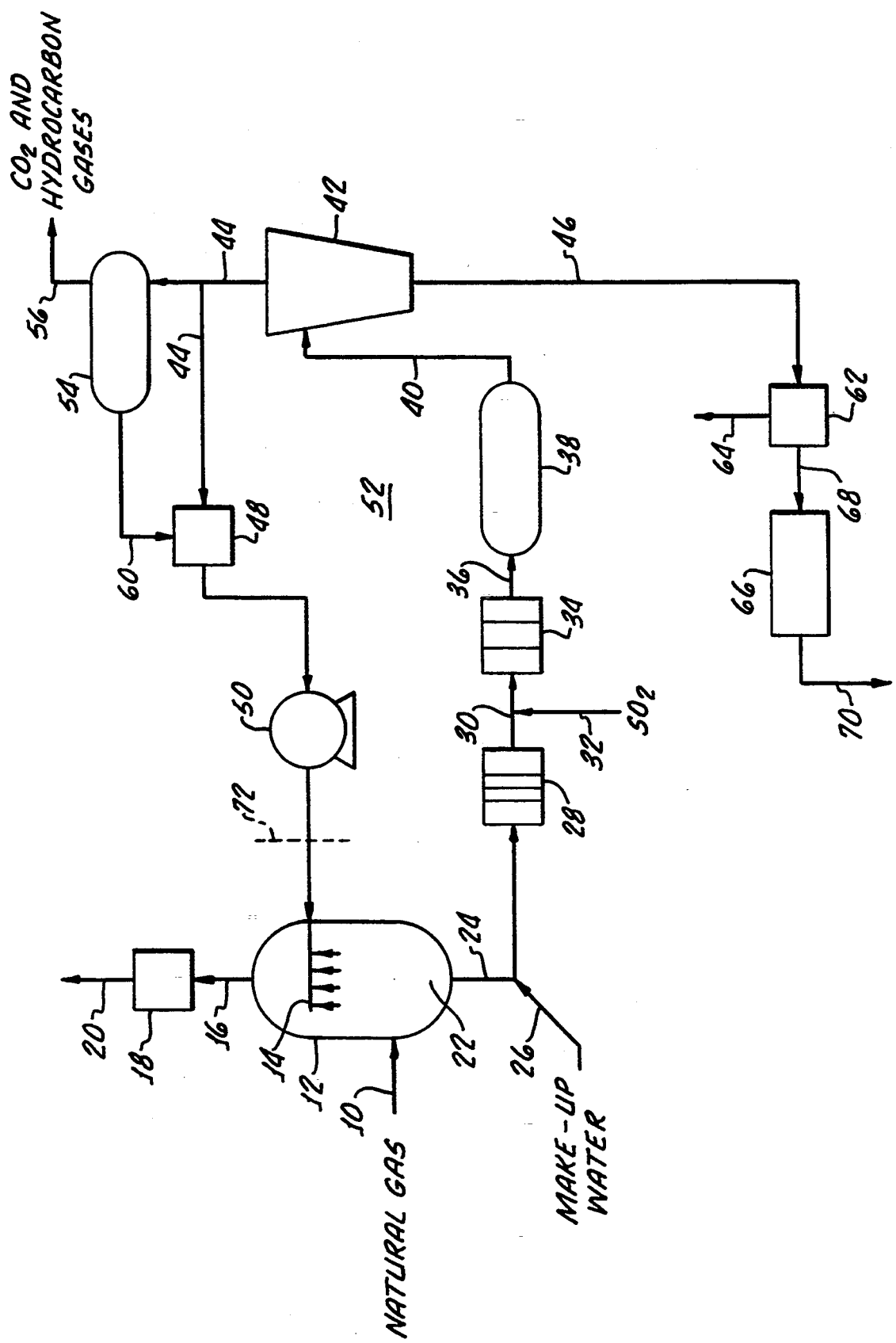

METHOD TO SCAVENGE HYDROGEN SULFIDE FROM NATURAL GAS

BACKGROUND OF THE INVENTION

1. Field of the Invention

This invention relates to methods for producing natural hydrocarbons, particularly, clean natural gas. In particular, this invention relates to methods for removing hydrogen sulfide from natural gas.

2. State of the Art

Naturally produced hydrocarbon gases typically contain a mixture of gaseous hydrocarbons and often some hydrogen sulfide. Hydrogen sulfide is toxic and has an intense, unpleasant stench. Consequently, government environmental regulations permit only small concentrations (<4 ppmv) of hydrogen sulfide in commercially distributed natural gas. Moreover, hydrogen sulfide is also extremely corrosive and, if not removed, may corrode the steel pipes used to transport hydrogen sulfide-containing fluids. In severe environments, sulfide stress cracking may occur, possibly resulting in the contents of the pipe escaping into the environment. Therefore, operators of producing wells will normally separate the hydrocarbon portion of the gas from the hydrogen sulfide at the well site.

Various methods exist for removing hydrogen sulfide from gases and liquids during petroleum processing. Many of these methods involve contacting the hydrogen sulfide containing gas with an aqueous solution of organic base to neutralize the hydrogen sulfide and remove it. These schemes require regeneration plants for the organic base used, and while possibly suitable for large plants, these schemes are prohibitively expensive for smaller operations, such as at well sites or on natural gas producing off shore oil platforms. Smaller installations involve a steep capital cost, have high operating costs, and generate contaminated waste products needing subsequent disposal. Moreover, in some small operations, for example off shore oil platforms, room to build plants is at a premium. In off shore oil platforms as well as other sites, the total cost of building and operating conventional hydrogen sulfide removal plants, including the cost of transporting the required solvents to the offshore platform and waste products from the offshore platform, is prohibitive.

It would be desirable to provide a similar economical method for the selective removal of hydrogen sulfide from natural gas at the site of production.

BRIEF DESCRIPTION OF THE DRAWINGS

The FIGURE shows a process flow diagram of one embodiment of the invention.

SUMMARY OF THE INVENTION

The present invention provides a method to remove hydrogen sulfide from natural gas by contacting the natural gas with a scrubber oil that absorbs the hydrogen sulfide. The natural gas typically contains some water, or water can be added, and the resulting mixture is used to form a water-in-scrubber oil emulsion. Sulfur dioxide added to the water-in-oil emulsion reacts with the hydrogen sulfide present in the emulsion to remove the hydrogen sulfide.

In a first embodiment of this invention, hydrogen sulfide is removed from natural gas. The natural gas is first contacted with a scrubber oil having a high affinity for hydrogen sulfide. Then, the hydrogen sulfide-containing scrubber oil is emulsified with water to form a water-in-oil emulsion, preferably using the water produced with the natural gas, but using added water if necessary. Finally, the water-in-oil emulsion containing the hydrogen sulfide is treated with sulfur dioxide.

In a second embodiment of the invention, similar to that described above, the sulfur dioxide is added to the water-in-oil emulsion and reacted with the hydrogen sulfide in the hydrogen sulfide-containing liquid scrubber oil, forming at least some sulfur and at least some partially oxidized sulfur species. Finally, the water-in-oil emulsion is separated to form a sulfur-containing oil phase and a partially oxidized sulfur species-containing water phase of the water-in-oil emulsion.

In another embodiment of this invention, similar to the embodiments described above, the scrubber oil is separated from the emulsion and recycled, as a final step.

DETAILED DESCRIPTION OF THE INVENTION

The source of the natural gas (the hydrocarbon portion usually containing between about 50 vol % and 95 vol % methane) treated in the present invention is not critical. It can be wells that produce only gas, wells that produce gas as well as crude oil, or wells that produce natural gas as an impurity in some other major product, for example water. As stated above, the natural gas normally treated in this invention often contains hydrogen sulfide in concentrations ranging from between about 100 and about 10,000 ppmw, or more, although as long as the gas contains hydrogen sulfide in any concentration, the process of this invention could be used. This invention provides a method for removing hydrogen sulfide from gas phase material, and the natural gas treated in this invention is normally substantially devoid of natural gas condensate or other liquids. The produced gas also usually contain at least some water or water vapor, usually ranging from between substantially less than about 1 wt % to greater than 25 wt %.

Referring to the FIGURE, the incoming natural gas 10 enters a gas/liquid contact zone, for example, a conventional scrubbing tower 12, where it contacts an absorbent scrubbing oil having a high capacity for hydrogen sulfide. As shown, the natural gas contacts a spray of oil 14, but any of a number of conventional gas/liquid contact methods can be used. Although most candidate oils have a substantial capacity for dissolving hydrocarbon gases, it is preferred that the scrubber oil have as little solubility for the natural gas as possible. In the limiting case of a scrubber oil having zero solubility for hydrocarbons, all the natural gas produced would leave the gas/liquid contact zone through the gas recovery line 16 for collection. In actual operation, preferred scrubber oils include naphthenic oils that dissolve a minimum volume of hydrocarbon components of the natural gas, but may dissolve substantially all of the hydrogen sulfide.

The light hydrocarbon gases recovered from the well leave through the gas recovery line 16 for collection. What methane leaves the tower first contacts a demister 18 to remove entrained scrubber oil and other unwanted vapors before leaving through the gas collection line 20 for use.

The gas/liquid contact zone is usually operated at the temperature and pressure the recovered natural gas has at the well head (a temperature of between about 20° C.

and 100° C., and a pressure of between about 1 atmosphere and about 100 atmospheres pressure ). The scrubber oil remains liquid at these conditions. In the embodiment shown, the scrubber oil spray collects at the bottom 22 of the tower forming a hydrogen sulfide-containing liquid. The scrubber oil liquid is collected and removed through the removal line 24. Preferably, the removal line has a water inlet 26 for adding make-up water to the hydrogen sulfide-containing liquid. The resultant blend is introduced into an in-line mixer 28 where a water-in-oil emulsion is formed.

The water-in-oil emulsion leaves in-line mixer 28 through a transfer line 30. Sulfur dioxide 32 is added to the emulsion in the transfer line 30. The resulting sulfur dioxide-containing mixture is added to an in-line mixer 34. As shown in the FIGURE, two separate in-line mixers are used; however, one in-line mixer could be used as long as the sulfur dioxide is added to the mixture after an emulsion is formed. Then the sulfur dioxide is further mixed into the already existing emulsion. The introduced sulfur dioxide reacts with the hydrogen sulfide contaminants in in-line mixer 34. The effluent from in-line mixer 34, in line 36, enters the reaction vessel 38 for completion of the reaction. The reaction vessel holds the reactants long enough to assure complete reaction, for example, about one to five minutes. The reaction vessel 38 may be any vessel that allows the reactants to have a suitable residence time, and can include, for example, a pressure vessel or a transfer pipe of suitable length. It will be appreciated that the time of the reaction may be much longer or shorter depending on the components comprising the reactants and the process conditions forced by the temperature and pressure of the natural gas. The effluent from the reaction vessel 40 is introduced into an oil phase/water phase separator, for example, a passive centrifugal separator 42, which separates a scrubber oil phase from a water phase. The separated scrubber oil phase leaves the passive centrifugal separator through the scrubber oil line 44, and the water phase leaves through the water phase line 46.

The separated scrubber oil phase in the scrubber oil line 44 passes through a cooling unit 48 and a pump 50 before returning to the gas/liquid contact zone 12. The scrubber oil therefore forms a closed oil recycle loop 52. The scrubber oil returns to the gas/liquid contact zone through the scrubber oil recycle line 44 to complete the oil recycle loop. The scrubber oil may require degassing if it contains a high concentration of hydrocarbons and carbon dioxide in solution. Therefore, as an option, all or part of the scrubber oil can pass through a gas/liquid separator 54 to remove the commercially valuable hydrocarbons containing $CO_2$ as an impurity in line 56, the remainder being removed through line 60 to rejoin the loop 52. The treated natural gas typically will have at least 75% of all hydrogen sulfide removed, preferably 90% of hydrogen sulfide removed, and most preferably 99% of all hydrogen sulfide removed. If the concentration of the hydrogen sulfide in the hydrocarbon gas is still unacceptably high after one treatment pass through the process of this invention, then recycling the hydrocarbon gas through the process a second time (or as many times as is required to achieve acceptable quality) removes yet more hydrogen sulfide.

The separated water phase in the water phase line 46 enters a oil/water separation means, for example a gas flotation cell, or DGF cell 62, although any other conventional oil/water separation means can be used. The DGF cell 62 separates any remaining hydrocarbons from the water phase. The water phase created by the treatment of the emulsion with sulfur dioxide is acidic, usually having a pH of less than about 5. Therefore, added base, for example sodium hydroxide, potassium hydroxide, ammonium hydroxide, sodium carbonate, potassium bicarbonate, calcium hydroxide, or similar neutralizing bases, neutralizes the acidic water phase to a substantially neutral pH, preferably a pH between about 5.5 and 8.5, and more preferably between 6.5 and 7.5. Any gaseous hydrocarbons or scrubber oil left in the aqueous phase is separated from the aqueous phase, and recycled back to the scrubber oil recirculation loop 52 in line 64. The hydrocarbon-free water phase enters the water conditioner 66 through line 68. The water entering the water conditioner 66 contains fully or partially oxidized sulfur species. In the water conditioner air, molecular oxygen, ozone, or other suitable oxidant added to the water phase oxidizes any partially oxidized sulfur species, for example, sulfite, to a more fully oxidized sulfur species, preferably sulfate. Oxidizing the water phase reduces the chemical oxygen demand of the water phase. The resulting, clean, low oxygen demand aqueous solution 70 preferably contains sulfate as the major sulfur-containing species and can be discarded. If an off shore platform, or the like, has an installation using the method of the present invention, then the conditioned water is preferably discarded by injecting it back into the formation for water flood or, less preferably, placing the conditioned water directly into the ocean without fear of adverse environmental effects.

The concentration of water in the fluid that enters in-line mixer 28 should be about 1 to 10 wt %. Many natural gases already contain this much water and, for these gases, no, water need be added to the scrubber oil removal line. However, other, dryer gases will require the addition of at least some water to form the desired water-in-oil emulsion.

Compared to the amount of hydrogen sulfide, a molar excess of sulfur dioxide is added to the emulsion in the in-line mixer transfer line 30. The excess forces hydrogen sulfide to react as completely as possible, thereby enhancing its removal rate. The preferred amount of sulfur dioxide added is between about 2 to 10 molar excess, preferably about 3 to 6 molar excess, and most preferably about 3 to 5 molar excess. In practical operation, the operator adds sulfur dioxide to the emulsion in the in-line mixer transfer line 30 and monitors the recycled oil spray. Either sulfur dioxide or hydrogen sulfide can be monitored using well known conventional methods, but since the point of the invention is to remove hydrogen sulfide, the hydrogen sulfide is the preferred target of monitoring. When the operator detects the monitored gas in the recycled oil spray, he adjusts the amount of sulfur dioxide added to the in-line mixer transfer line 30 accordingly.

The reaction that removes hydrogen sulfide is given by the following general nonstoichiometric equation:

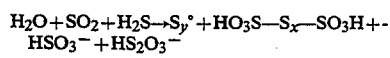

where y is an integer from 1 to 20, and x is and integer from 1 to 80. The reaction is complex and produces many products in a manner not currently predictable. However, it is known that, in general, the reaction produces a first class of products: elemental sulfur, $S_y°$, the predominant product of the reaction, and a second class of products: the partially oxidized sulfur containing species (for example, sulfite, $HSO_3^-$, thiosulfate, $HS_2O_3^-$, and polythionic acids, $HO_3S—S_x—SO_3H$, among others). The two classes of products tend to partition between the oil phase and the water phase, with sulfur having an affinity for the oil and the various partially oxidized sulfur species having an affinity for water. Usually, the scrubber oil is recycled until it is saturated with elemental sulfur. A filter 72 prevents sulfur particles from recycling with the scrubber oil stream. The sulfur saturated scrubber oil is then removed, and the sulfur recovered by conventional techniques. The polythionic acids and other partially oxidized sulfur species in the water phase are preferably fully oxidized to sulfate as described above before disposing of the water stream.

Since natural gas can be transported in undersea or on-shore pipelines, it is frequently desirable to treat the gas before, or at some stage during, transport thereof. Treatment can be conducted in production manifolds at any stage in the recovery of the natural gas. In general, the treatment method of this invention can be conducted at any point in the subsequent processing of natural gas after separation of the gas from produced liquids, for example, crude oil produced with the natural gas.

The embodiment described above is widely suitable for application in all aspects of natural gas production, transportation, and commercial exploitation, but it is particularly suitable for smaller scale operations, in particular at the source of natural gas. The method of this invention is therefore especially suitable for use at, for example, well sites and off shore platforms, but could also be used at other locations, for example, pumping stations. Treating natural gas with the method of this invention removes toxic, smelly, and corrosive hydrogen sulfide early in the transportation and handling of the natural gas. The resulting transportation of hydrogen sulfide-free natural gas is easier and safer than trying to transport natural gas containing hydrogen sulfide.

Although this invention has been primarily described in conjunction with references to one particularly preferred embodiment thereof, the foregoing description will suggest many alternatives, modifications, and variations to those skilled in the art. Accordingly, the inventors intend that the spirit and scope of the appended claims embrace within the invention all such alternatives, modifications, and variations.

We claim:

1. A gas desulfurization process comprising:
   (1) contacting a gas stream comprising an $H_2S$-containing natural gas with a liquid scrubber oil under conditions such that $H_2S$ is removed from said gas stream into said scrubber oil;
   (2) separately recovering from said contacting a product gas stream of lowered $H_2S$ content and a liquid $H_2S$-containing scrubber oil;
   (3) emulsifying the liquid $H_2S$-containing scrubber oil with water to form a water-in-oil emulsion;
   (4) adding $SO_2$ to the water-in-oil emulsion; and
   (5) reacting the added $SO_2$ with $H_2S$ contained in said water-in-oil emulsion.

2. A gas desulfurization process comprising:
   (1) contacting a gas stream comprising an $H_2S$-containing natural gas with a liquid scrubber oil under conditions such that $H_2S$ is removed from said gas stream into said scrubber oil;
   (2) separately recovering from said contacting a product gas stream of lowered $H_2S$ content and a liquid $H_2S$-containing scrubber oil;
   (3) emulsifying the liquid $H_2S$-containing scrubber oil with water to form a water-in-oil emulsion;
   (4) adding $SO_2$ to the water-in-oil emulsion;
   (5) reacting the added $SO_2$ with $H_2S$ contained in said water-in-oil emulsion;
   (6) subsequently separating water from said water-in-oil emulsion so as to produce separate streams of water and liquid scrubber oil; and
   (7) recycling liquid scrubber oil from step (6) back to contacting step (1).

3. The process of claim 2 wherein the recycled liquid scrubber oil is cooled prior to being returned to said contacting step (1).

4. The process of claim 3 wherein the recycled liquid scrubber oil is maintained free of solid elemental sulfur.

5. The process of claim 2 wherein the recycled liquid scrubber oil is maintained free of solid elemental sulfur.

6. The process of claim 1, 2, or 5 wherein said gas stream consists essentially of an $H_2S$-containing natural gas.

7. The process of claim 1, 2, or 5 wherein a molar excess of $SO_2$ for reaction with $H_2S$ is added in step (4).

8. The process of claim 1, 2, or 5 wherein said emulsifying in step (3) is carried out only with water originally contained in the natural gas.

9. The process of claim 1, 2, or 5 wherein said emulsifying is carried out with water added to the $H_2S$-containing scrubber oil.

10. The process of claim 1, 2, or 5 wherein the scrubber oil remains substantially completely in the liquid form during the contacting in step (1).

11. The process of claim 1, 2 or 3 wherein said contacting in step (1) is carried out in a scrubbing tower.

12. The process of claim 11 wherein:
   (a) a substantial proportion of the $H_2S$ in said gas stream is absorbed into said scrubber oil in step (1);
   (b) an excess of $SO_2$ for reaction with $H_2S$ is added in step (4);
   (c) $SO_2$ and $H_2S$ are reacted in step (5) so as to effect essentially complete reaction of $H_2S$; and
   (d) the scrubber oil remains substantially completely in the liquid form during the contacting in said scrubbing tower.

13. The process of claim 12 wherein the recycled scrubber oil contains sulfur components, with the sulfur components being maintained at a concentration no greater than elemental sulfur saturation.

14. The process as defined in claim 13 wherein the process iS performed on an off-shore platform in the ocean.

15. The process as defined in claim 14 wherein any water produced in said process is introduced into a formation below the ocean floor.

16. The process as defined in claim 14 wherein any water produced in said process is introduced into the ocean.

17. The process of claim 11 wherein:
   (a) at least 75% of the $H_2S$ in said gas stream is absorbed into said scrubber oil in step (1);
   (b) a 2 to 10 fold molar excess of $SO_2$ for reaction with $H_2S$ is added in step (4); (c) $SO_2$ and $H_2S$ are reacted in step (5) so as to effect essentially complete reaction of $H_2S$;

(d) the scrubber oil remains substantially completely in the liquid form during the contacting in said scrubbing tower; and (e) the gas stream consists essentially of $H_2S$-containing natural gas.

18. The process of claim 17 wherein at least 90% of the $H_2S$ in said gas stream is absorbed into the liquid scrubber oil in step (1) and wherein (f) the scrubber oil has a relatively low absorption affinity for natural gas hydrocarbons;

(g) the recycled scrubber oil contains sulfur components, with the sulfur components being maintained at a concentration no greater than elemental sulfur saturation; and (h) said emulsifying in step (3) is carried out with water comprising water originally contained in the gas stream consisting essentially of $H_2S$-containing natural gas.

19. The process of claim 18 wherein said emulsifying in step (3) is carried out only with water comprising water originally contained in the gas stream consisting essentially of $H_2S$-containing natural gas, and:

(i) the liquid scrubber oil contacts said gas stream in said scrubbing tower as a spray; and (j) the scrubber oil is a naphthenic oil.

20. The process as defined in claim 19 wherein said process is performed on an off shore platform in the ocean, with any water therein produced being introduced into a formation beneath the ocean floor.

21. The process as defined in claim 2, 3, or 4 wherein the process is performed on an off-shore platform in the ocean.

22. The process as defined in claim 21 wherein water separated in step (6) is introduced into a formation below the ocean floor.

23. The process as defined in claim 21 wherein water separated in step (6) is introduced into the ocean.

* * * * *